United States Patent
Shah et al.

(10) Patent No.: US 6,535,747 B1
(45) Date of Patent: Mar. 18, 2003

(54) SYSTEM AND METHOD FOR COVERAGE AND INTERFERENCE PREDICTION AND TRADEOFF

(75) Inventors: Ali R. Shah, Dallas, TX (US); Hossam H'mimy, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/470,912

(22) Filed: Dec. 23, 1999

(51) Int. Cl.[7] .................................................. H04B 1/10
(52) U.S. Cl. ........................ 455/522; 455/62; 455/63; 455/517; 455/562
(58) Field of Search .................... 455/446, 453, 455/452, 522, 69, 525, 53.4, 56.1, 33.2, 33.3, 62–65, 67.1, 67.6, 513, 63, 451; 370/329, 332, 333; 375/202, 231, 326, 330, 296, 299

(56) References Cited

U.S. PATENT DOCUMENTS

| | | | | |
|---|---|---|---|---|
| 5,023,900 A | * | 6/1991 | Tayloe et al. | 379/32 |
| 5,095,500 A | | 3/1992 | Tayloe et al. | |
| 5,465,390 A | * | 11/1995 | Cohen | 455/446 |
| 5,561,841 A | | 10/1996 | Markus | |
| 5,649,292 A | * | 7/1997 | Doner | 455/447 |
| 5,787,352 A | * | 7/1998 | Benveniste | 455/452 |
| 5,878,328 A | | 3/1999 | Chawla et al. | |
| 6,044,249 A | * | 3/2000 | Chandra et al. | 455/513 |
| 6,047,191 A | * | 4/2000 | Desgagne | 455/455 |
| 6,052,596 A | * | 4/2000 | Barnickel | 455/450 |
| 6,072,788 A | * | 6/2000 | Peterson et al. | 370/337 |
| 6,094,580 A | * | 7/2000 | Yu et al. | 455/446 |
| 6,097,956 A | * | 8/2000 | Veeravalli et al. | 455/446 |
| 6,128,498 A | * | 10/2000 | Benveniste | 455/450 |
| 6,128,500 A | * | 10/2000 | Raghavan et al. | 455/453 |
| 6,181,918 B1 | * | 1/2001 | Benveniste | 455/450 |
| 6,223,040 B1 | * | 4/2001 | Dam | 455/447 |
| 6,259,922 B1 | * | 7/2001 | Benveniste | 455/452 |
| 6,307,841 B1 | * | 10/2001 | Rowles et al. | 370/252 |

FOREIGN PATENT DOCUMENTS

| | | |
|---|---|---|
| EP | 0 431 956 A2 | 6/1991 |
| EP | 1 028 543 A1 | 8/2000 |

* cited by examiner

Primary Examiner—Daniel Hunter
Assistant Examiner—Pablo Tran

(57) ABSTRACT

A method and system of optimizing the signal strength and interference characteristics of a wireless telecommunications network which includes a plurality of cells with at least one of the cells being disturbed (the "disturbed cell") by events occurring in one or more offending cells. The method comprises the step of computing a distribution of disturbance events in the disturbed cell as a function of disturbances created by the offending cells. The distribution of disturbance events is then utilized to predict changes in coverage of the offending cells as changes in the carrier-to-interference (C/I) ratio of the disturbed cell are made. Such predictions then lead to modifying the power levels of wireless components in the network to reach acceptable tradeoffs between interference and coverage. Thus, the tradeoff is a function of the predicted changes in C/I and acceptable coverage and interference thresholds for the network.

27 Claims, 5 Drawing Sheets

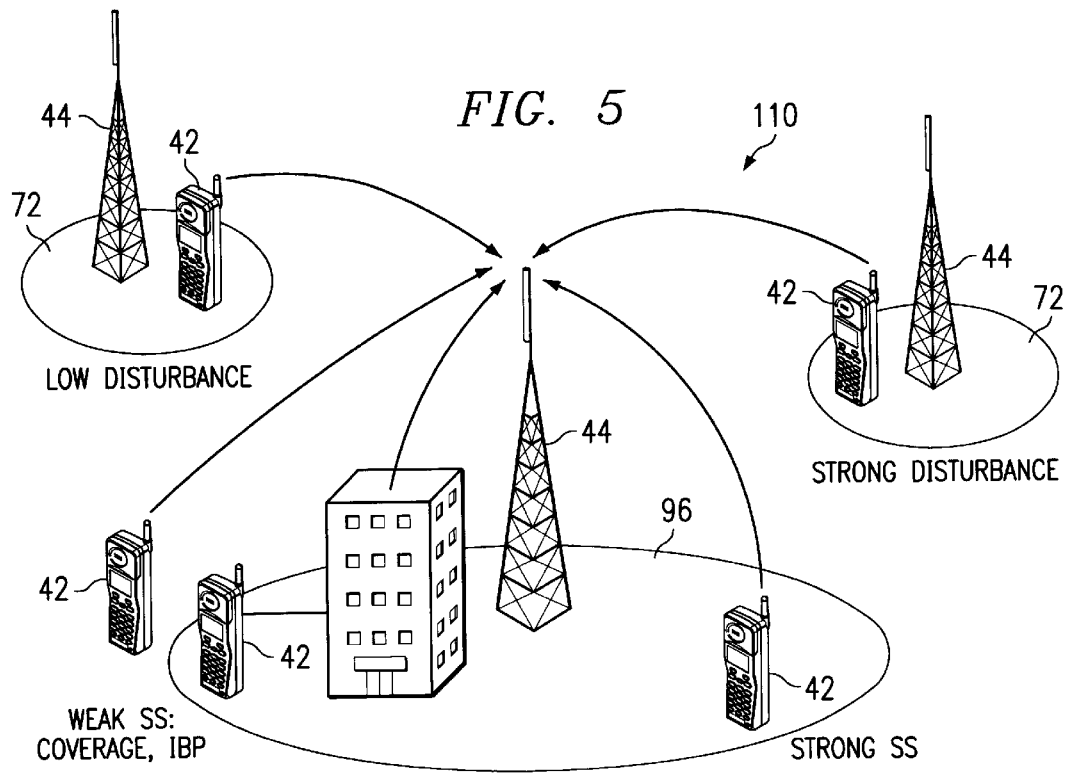
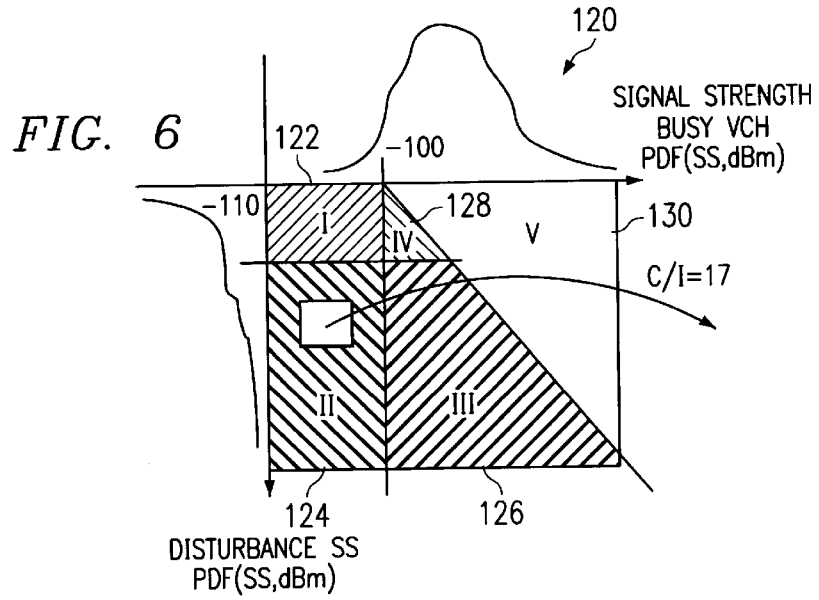

SYSTEM AND METHOD FOR COVERAGE AND INTERFERENCE PREDICTION AND TRADEOFF

CROSS-REFERENCE TO RELATED APPLICATION

The application is commonly assigned and related to U.S. patent application Ser. No. 09/426,139 entitled "A System and Method for Identification of Uplink/Downlink Interference Sources", by Ali R. Shah and Hossam H'mimy, filed Oct. 22, 1999, the entirety of which is incorporated herein by reference.

TECHNICAL FIELD

This invention relates in general to wireless telecommunications networks and applications and, in particular, to a method and system of optimizing the signal strength and interference characteristics of the network. More particularly, the invention relates to methods of predicting changes in coverage as changes in the carrier-to-interference (C/I) ratio of cells in the network are made, as well as modifying the power levels of wireless components in the network to reach acceptable tradeoffs between interference and coverage.

BACKGROUND OF THE INVENTION

Without limiting the scope of the invention, its background is described in connection with a wireless telecommunications network utilizing recordations of disturbance events to predict changes and determine tradeoffs between interference and coverage as power levels are modified, as an example.

Present-day mobile telephony has spurred rapid technological advances in both wireless and wireline communications. The wireless industry, in particular, is a rapidly growing industry, with advances, improvements, and technological breakthroughs occurring on an almost daily basis. Many mobile or wireless telecommunications systems, among them the European GSM-system, have passed through several generations of advancements and development phases. System designers are now concentrating on further improvements to such systems, including system refinements and the introduction of optional subscriber services.

Most wireless telecommunications systems are implemented as cellular telephone networks wherein a group of Base Transceiver Stations (BTSs), or base stations are served by a centrally located switch. The switch is commonly referred to as a Mobile Switching Center (MSC). The base stations are spaced apart from each other by distances of between one-half and twenty kilometers. Each base station is assigned a number of two-way voice and control channels. The voice channels transmit voice signals to and from proximately located mobile stations, and transmit control information to and from these mobile stations, usually for the purpose of establishing a voice communications link.

A typical cellular telephone network also includes a group of interconnected MSCs, which operate in association with a gateway mobile switching center (GMSC) through which the cellular telephone network interconnects with a conventional Public Switched Telephone Network (PSTN). In addition, at least one Home Location Register (HLR) operates within the cellular telephone network. The HLR stores network subscriber information, including the identified location of current mobile stations within the network.

In response to an incoming call placed to a mobile station, the MSC queries the HLR to determine the current location of the station. The HLR "looks up" the current location of the mobile station and contacts the currently serving MSC to pre-route the call and retrieve a temporary location directory number, which is utilized to route the call through the telecommunications network for termination of the call to the mobile station. The MSC instructs the base station serving the cell in which the mobile station is located to page the mobile station. Responding to the page, the mobile station requests assignment of a channel, and the network terminates the call through the serving MSC and over the assigned channel.

Calls by mobile subscribers can be affected by interference or radio disturbance events which, in turn, limit the efficiency of the network. As such, it is important to identify those cells within the network, which are sources of and subject to radio disturbance events. Interference itself can be either external or internal to the radio network. The internal interference results from call activities within a network cell site. In this regard, it is appropriate to term the cells as either "offending" or "disturbed." In this regard, a radio disturbance event typically occurs during a cellular call, either on the downlink (from a base station to a mobile station) or on the uplink (from a mobile station to a base station). The disturbance events include co-channel interference or adjacent channel interference. Similarly, different sources of external interference exist that can create problems in the network.

Various methods exist for determining when a disturbance event has occurred. For example, a comparison of signal strength versus a measurement of speech quality can be employed to determine when a low Carrier-to-Interference (C/I) ratio or high Bit Error Rate (BER) exists. When acceptable signal strength is correlated with degraded speech quality for an extended period of time (usually measured in seconds), that cell can be considered "disturbed." Failure to identify and analyze sources of such disturbances could result in poor channel quality or the sealing of devices in the network, which means they are unavailable for use in handling calls.

Additionally, methods and systems exist for identifying cells within the wireless telecommunications network that are disturbed. One such method involves the use of downlink interference prediction tools, or prediction methods which use model-based prediction algorithms. Such methods predict where interference may exist within a given network coverage area allowing subsequent use of such predictions for cell and frequency planning, particularly in initial network designs. Frequency planning is used to account for frequency reuse by different cells which creates interference in adjacent or neighboring cells.

The validity of such predictions is dependent on a number of factors, including the accuracy of the propagation model utilized, the resolution of the terrain data, and so forth. Such tools are helpful in identifying the cells that are causing downlink interference, but taken together are often inaccurate because of the dependence on predictions. That is, such prediction tools do not always account for "real-life" sources of interferences in the coverage area as determined through more empirical measurement methods. "Real-life" sources may include natural obstructions and buildings.

Currently, radio network engineers use the downlink interference prediction tools, along with trial and error, and "drive-by" techniques to predict and measure the effects of changes in the radio network. These tools are useful in predicting where interference will effect the cellular system given a specific output power generated by the radio base station. The predictions are accurate only if the propagation model is accurate. The sources of interference can be identified, but again, the accuracy is a function of the propagation model. The drive-by methods, on the other hand, are quite accurate as they are based on clinical measurements, but require an immense amount of resources to implement.

Another method utilized to identify the source of interference in a wireless telecommunications network by the same inventors is disclosed and claimed in the related application by the same inventors. In the related application, the inventors describe a method of underlying sources of uplink/downlink interference by considering call events occurring in the offending cells and the resulting disturbance events in a disturbed cell. These event recordings are run in conjunction with each other for the purpose of correlating and computing the two events as a function of time. The time stamps of the call start attempts (voice channel seizure events) result in Call Event Recordings (CER) for possible adjacent channel/co-channel mobiles.

While prior art techniques are useful in identifying, predicting and measuring the effects of interference in the network, they do not provide guidance to the network engineer as to how to best modify the network to improve its efficiency. In particular, the prior art methods do not suggest how changes in one part of the network can effect the performance in another part. What is needed is a method of predicting changes in the disturbed cell with interference created in other offending (co-channel) cells. A means of performing a tradeoff and deciding whether to improve coverage in the disturbed cell or sacrifice it with lesser interference in a co-channel neighbor would provide numerous advantages.

SUMMARY OF THE INVENTION

The present invention provides a method and system for optimizing signal strength and interference characteristics in a wireless telecommunications network. With the present invention, once the network operator has identified the sources of interference, such information may be used in improving performance of the network. That is, a tradeoff may be performed which includes improving coverage in the disturbed cell by sacrificing coverage in an offending cell as a function of signal strength and interference.

Disclosed in one embodiment is a method of optimizing the signal strength and interference characteristics in a wireless telecommunications network including a plurality of cells with at least one of the cells being disturbed (the "disturbed cell") by events occurring in one or more offending cells. The method comprises the step of computing a distribution of disturbance events in the disturbed cell as a function of disturbances created by the offending cells. The distribution is a probability matrix for different carrier (coverage)-to-interference (C/I) ratio levels. As such, a distribution of disturbance events can be computed by computing the signal strength for calls in progress and calls not in progress (on an idle channel) to utilize in calculating C/I ratio levels. In particular, the C/I combinations for particular points in the network are summed to provide a range of C/I.

The C/I ratio levels are then utilized to create a signal strength plan which defines regions in order to perform a cell assessment, as well as to identify an acceptable threshold for the network. For illustrative purposes, 17 dB is shown to be the acceptable threshold. Therefore, for example, Region I corresponds to low disturbance level and low signal strength (C/I<17dB), while Region II corresponds to a high disturbance level and low signal strength (C/I<17 dB). In one embodiment, five (5) regions are identified in the C/I distribution.

The method also comprises the step of utilizing the distribution of disturbance events to predict changes in coverage of the offending cells as changes in the carrier-to-interference (C/I) ratio of the disturbed cell are made. This includes calculating the improvement (GCI) in C/I ratio level in the disturbed cell and the effect in C/I ratio levels in the offending cells. The improvement is calculated by increasing the signal strength in the offending cells while decreasing the coverage provided by the disturbed cell. Once the increase and decrease has been performed, respectively, the signal strength and interference are then adjusted so as to avoid a significant decrease in coverage in the offending cells.

The improvement may also be calculated by decreasing the signal strength in the offending cells while increasing the coverage provided by the disturbed cell. Again, adjustments must be performed on the signal strength and interference in order to avoid a significant decrease in service provided to mobile stations in the offending cells.

The method further comprises the step of modifying the power levels of wireless components in the network to reach acceptable tradeoffs between interference and coverage. The tradeoff is performed as a function of the predicted changes in C/I, along with acceptable coverage and interference thresholds for the network. In modifying the power levels, a check is performed to verify whether the improved carrier-to-interference ratio level (GCI) for a higher power setting (Power+Delta) is acceptable. If the GCI is positive and the higher power setting is acceptable, then the recommended mobile station power is set to (Power+Delta). If, however, the GCI for a higher power setting (Power+Delta) is not acceptable, then a check is done to determine if the power for a weaker setting is acceptable. If neither weaker nor higher powers are acceptable, then the current setting is retained.

A technical advantage of the present invention includes more accurate predictions for implementing a tradeoff due to the utilization of empirical measurements based on recorded disturbance events and not predictions. As such, the interference analysis takes into account the behavior of all mobile stations within the network rather than a particular mobile event.

Another technical advantage of the present invention is enabling radio network engineers to optimize the network with the objective of minimizing interference.

BRIEF DESCRIPTION OF THE DRAWINGS

For a more complete understanding of the present invention, including its features and advantages, reference is made to the following detailed description of the invention, taken in conjunction with the accompanying drawings of which:

FIG. 5 illustrates a probability (mass) distribution of coverage-to-interference in a cell, in accordance with a preferred embodiment of the present invention;

FIG. 6 is another view of the mass distribution matrix illustrating corresponding regions for cell assessment, in accordance with a preferred embodiment of the present invention;

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
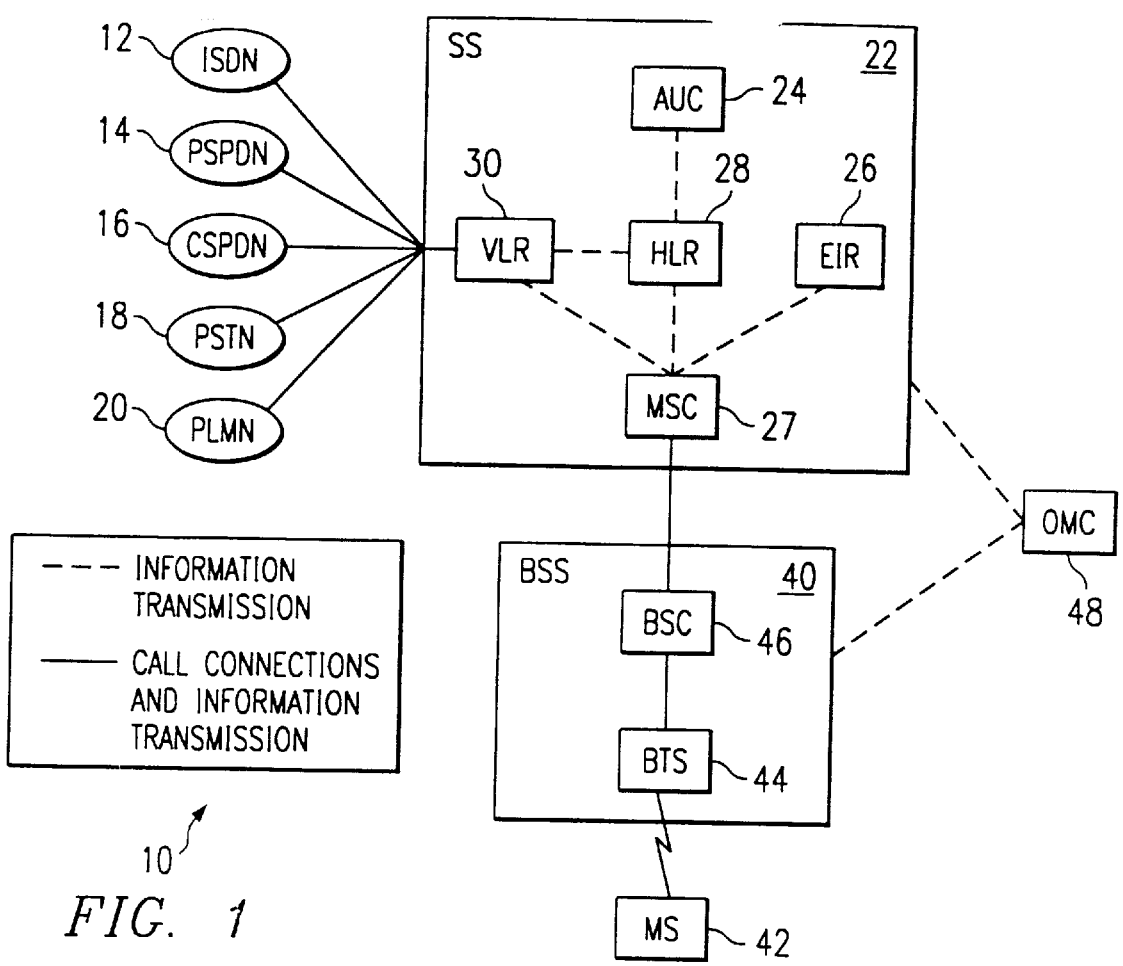
FIG. 1 depicts a telecommunications network in which a preferred embodiment of the present invention may be implemented.

To better understand the invention, reference is made to FIG. 1, wherein a diagram of a wireless telecommunications network, denoted generally as 10, in which a preferred embodiment of the present invention may be implemented is shown. Telecommunications network 10 includes a Switching System (SS) 22 and a Base Station System (BSS) 40. Each of these systems contains a number of functional units, which process information and carry out operations of a functional network 10. The functional units themselves may be implemented utilizing various telecommunication hardware devices.

The SS 22 includes a Visitor Location Register (VLR) 30, a Home Location Register (HLR) 28, an Authentication Center (AUC) 24, an Equipment Identity Register (EIR) 26, and a Mobile Switching Center (MSC) 27. The BSS 40 comprises a Base Station Controller (BSC) 46 and a Base Transceiver Station (BTS) 44. An Operations and Maintenance Center (OMC) 48 is connected to equipment present within SS 22 and to BSC 46. The dashed lines in FIG. 1 represent information transmission, while solid lines represent both call connections and information transmission.

Telecommunications network 10 illustrated in FIG. 1 may be realized as a network of neighboring radio cells, which together provide complete coverage for a service area. The service area is the geographic area served by a given telecommunications supplier and the area in which the supplier stands ready to provide its service. Each cell contains a BTS 44 operating on a set of radio channels. These channels differ from the channels utilized by neighboring cells in order to avoid interference.

Each BSC 46 controls a group of BTSs 44. The BSC 46 controls well-known telecommunication functions, such as "Handover" and power control. A number of BSCs (e.g., BSC 46) are served by a MSC 27, which controls calls to and from a Public Switched Telephone Network (PSTN) 18. MSC 27 also controls calls to and from an Integrated Services Digital Network (ISDN) 12, a Public Land Mobile Network (PLMN) 20, a Circuit Switched Public Data Network (CSPDN) 16, and also, various private networks such as, a Packet Switched Public Data Network (PSPDN) 14.

Each unit is actively involved in carrying speech connections between the Mobile Station (MS) 42 and, for example, a subscriber in a fixed network, such as PSTN 18. Because of the extreme difficulties involved in completing an MS 42 terminated telephone call, a number of databases located within the telecommunications network 10 keep track of the MS 42. The most important of these databases is the HLR 28. When a user subscribes to a wireless telecommunications network, such as the telecommunications network 10 depicted in FIG. 1, the user is registered within the HLR 28. The HLR 28 contains subscriber information, such as supplementary services and authentication parameters.

Data describing the location of the MS 42, such as the area (i.e., the MSC area) in which the MS 42 presently resides, is contained within the HLR 28. The MSC area represents that portion of the telecommunications network 10 covered by a single MSC 27. In order to route a call to a mobile subscriber within a telecommunications network, such as the telecommunications network 10 depicted in FIG. 1, the path through the network links to the MSC 27 in the MSC area where the subscriber is currently located. Data describing the location of the MS 42 is thus actively altered as the MS 42 moves from cell to cell within the telecommunications network 10. MS 42 sends location information, via MSC 27 and VLR 30, to an associated HLR 28, which permits MS 42 to receive calls. The AUC 24 is connected to HLR 28, and provides HLR 28 with authentication parameters and ciphering keys utilized for security purposes.

Furthermore, VLR 30 is a database that contains information regarding all mobile stations currently located in the MSC area. When MS 42 roams in a new MSC area, the VLR 30 connected to the MSC 27 in that particular area requests data about the MS 42 from HLR 28. Simultaneously, HLR 28 is provided with the location of the MSC area in which MS 42 resides. If it is later desired to make a call from MS 42, VLR 30 will have at its disposal, all the information necessary for call set-up, without being forced to interrogate HLR 28 each time a call is made. The VLR 30 thus functions as a distributed HLR 28. As such, VLR 30 also contains precise information about the location of the MS 42 in the MSC area.

If an individual subscriber within the fixed network PSTN 18 desires to make a call to a subscriber, an exchange within PSTN 18 connects the call to an MSC 27 equipped with a function commonly known as a "gateway" function. In the telecommunications arts, an MSC 27 having a "gateway" function is commonly referred to as a Gateway MSC (GMSC). The MSC 27 in telecommunications network 10 of FIG. 1 may be implemented as a GMSC. Most MSC's within GSM telecommunications networks function as a GMSC. The GMSC must find the location of the searched MS 42, which can be accomplished by interrogating the HLR 28 where the MS 42 is registered. The HLR 28 then replies with the address of the current MSC area. Thereafter, the GMSC can re-route the call to the correct MSC 27. When the call reaches that MSC 27, the VLR 30 will have additional information regarding the precise location of the MS 42. The call can then be switched through to completion.

The telecommunications network 10 depicted in FIG. 1 may be implemented as a GSM-type network. Those skilled in the art can appreciate that although the present invention is described and illustrated in the context of a GSM network standard, the present invention may also be implemented in accordance with other standards and networks, including AMPS/TDMA utilized in North and South America. The GSM network standard, as discussed herein, is merely presented for illustrative purposes only and is not a limiting feature of the present invention.

Figure 2:
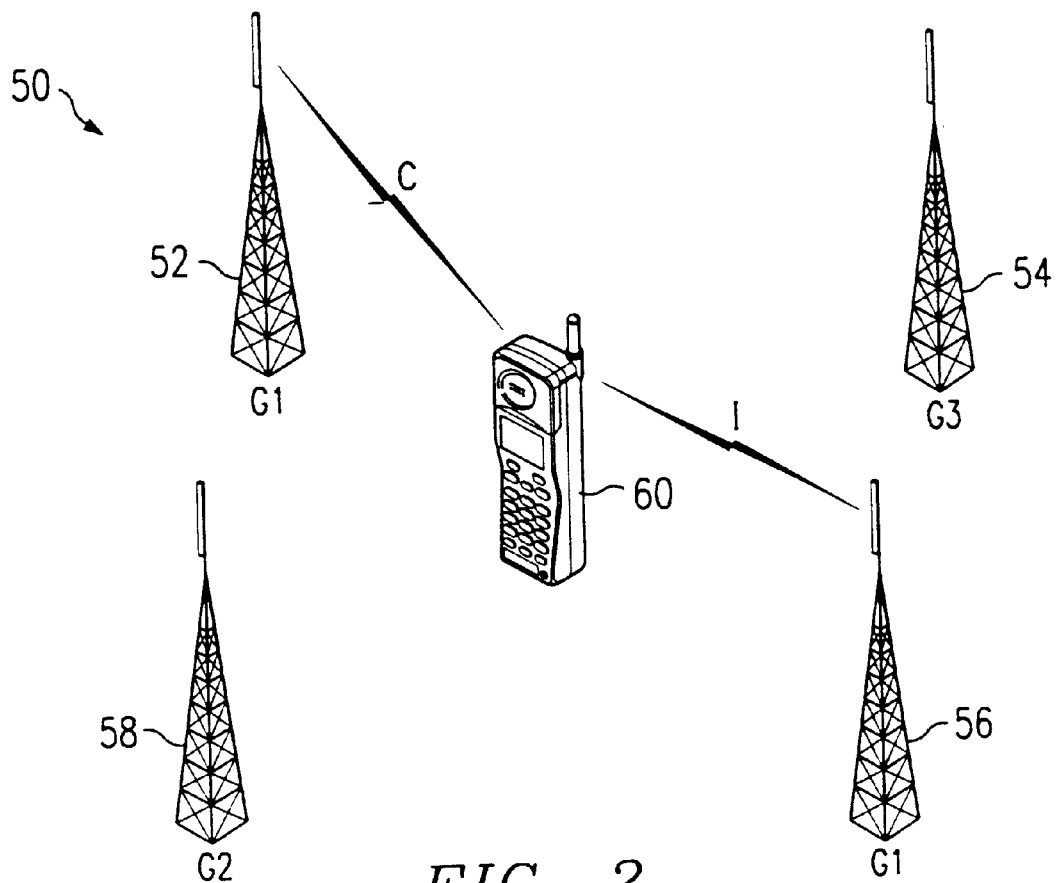
FIG. 2 illustrates downlink adjacent channel interference in a telecommunications network, in accordance with the related application.

FIG. 2 is a block diagram, denoted generally as 50, illustrating downlink adjacent channel interference in a telecommunications network 10. According to the method and system described in the related application, sources of downlink interference (i.e., offending cells) are identified along with disturbed cells within a network 10 such as that depicted and described in FIG. 1. The call events occurring in offending cells of the telecommunications network 10 and the disturbance events occurring in the disturbed cell of the telecommunications network 10 are first recorded in conjunction with each other. The analysis is then based on correlating call events and thereafter correlating these events with disturbance events. The time correlation generates a list of "offending cells" and "disturbed cells". This correlation then permits the perceived interference in an adjacent/co-channel cell to be associated with a possible source of disturbance. Statistical methods based on empirical data, as opposed to prediction tools, are employed thereafter to determine definite disturbance sources. This allows for a more accurate method and system for identifying and analyzing interference in a telecommunications network 10, as well as implementing a tradeoff.

FIG. 2 thus illustrates an example of downlink adjacent channel interference. Radio base stations 52, 54, 58 and 56 are depicted in FIG. 2, along with mobile station 60 (i.e., a cellular telephone). Those skilled in the art can appreciate that mobile station 60 of FIG. 2 is analogous to mobile station 42 of FIG. 1. In the example depicted in FIG. 2, base stations 52, 54, 58 are transmitting with frequencies G1, G2, and G3. Base station 56 transmits on G1 and is therefore utilizing a co-channel to base station 52. Mobile station 60 is currently using G1 and is being served by base station 52 which transmits the carrier signal "C", also referred to as coverage, or carrier. On the other hand, base station 56 is reusing the same frequency and generates the interference for the mobile station 60.

Mobile station 60 utilizes frequency G1 to receive information from a co-channel base station. Mobile station 60 receives carrier "C" which is transmitted from base station 52 at frequency G1 and interference "I", which is transmitted from an adjacent channel radio base station (i.e., base station 56), also at frequency G1. The radio base station contributing to the interference is termed as the "offender," and the cell in which it resides is referred to as the "offending cell." Mobile station 60, which is affected by adjacent channel interference, is referred to in the parlance utilized herein as "disturbed," and belongs to the "disturbed cell." This was an example of downlink interference where the base station disturbs mobile stations. It is quite easy to understand how uplink interference occurs, i.e., mobiles of an offending cell disturb radio base station receivers on the uplink.

Sources of disturbance are not, however, confined to co-channel radio base stations. Another source of disturbance can be found in adjacent channel base stations, which are still considered as internal disturbance sources. The related application referenced herein describes functions in a manner that identifies all possible sources of interference within a telecommunications network 10. Those skilled in the art will appreciate that the terms "disturbance" and "interference" can be utilized interchangeably. Such terms are utilized interchangeably herein.

A "radio disturbance" or "disturbance event" on a downlink channel is also detected for digital calls when sufficient signal strength is correlated in time with degraded speech quality for a period greater than D seconds. Those skilled in the art will appreciate that the terms "digital calls" and "digital traffic" can be utilized interchangeably. The length of time is dependent on the hardware and measurement method utilized. Speech quality is measurable as C/I (i.e., Carrier-to-Interference ratio) or BER (i.e., Bit Error Rate).

In accordance with the related application, sources of downlink interference can be analyzed in the following manner. Initially, possible sources of disturbance can be detected by correlating call event recordings with disturbance event recordings. Definite sources of disturbance can then be verified utilizing propagation considerations. Thereafter, a test can be performed to verify if all disturbance events have been correlated with call events. If all disturbance events have been successfully correlated with call events, then a disturbance distribution is computed for each disturbed cell. Improvements are then recommended by trading coverage with interference. Long term improvements to the system can also be recommended based on the disturbance distribution. If, however, all disturbance events are not successfully correlated with call events, then external interference sources are identified. An alternative approach involves identifying the disturbed cells and then concentrating on those identified disturbed cells, rather than the entire telecommunications network 10.

Figure 3:
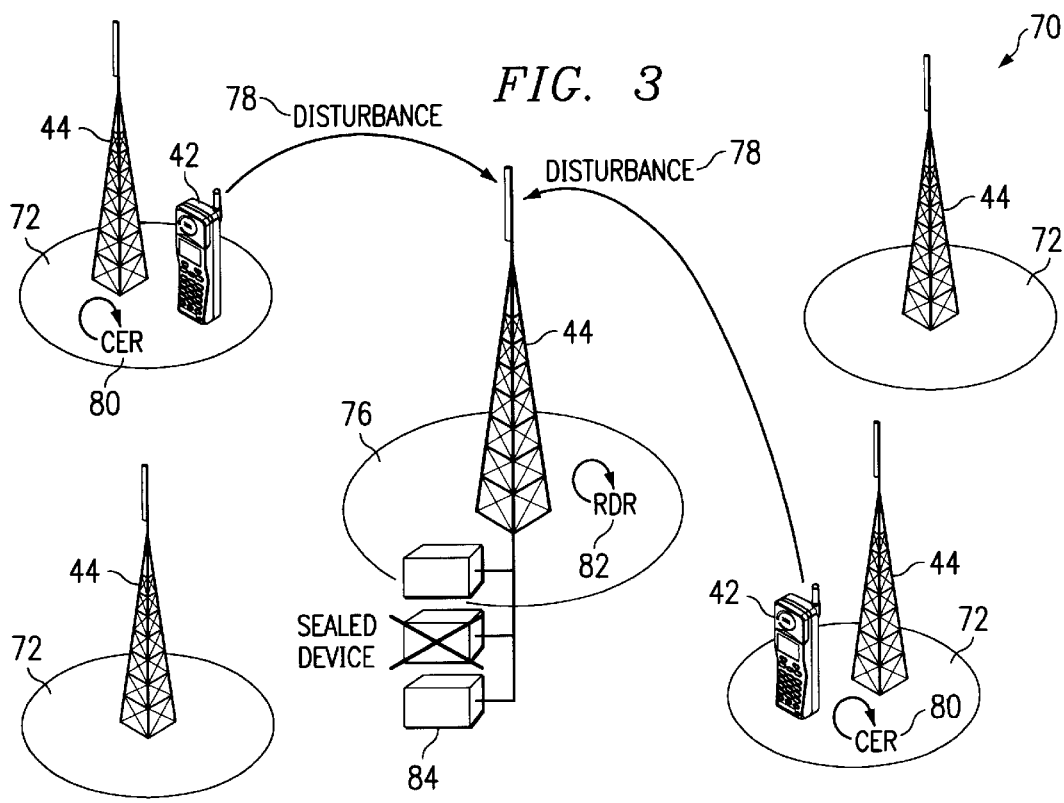
FIG. 3 illustrates Call Event Recording (CER) and Radio Disturbance Recordings (RDR) correlation, in accordance with related application.

FIG. 3 illustrates the first step of detecting possible sources of interference. The Call Event (Traffic) Recording (CER) 80, also referred to as a "cell event recording" occurring in the offending cells 72 and the Radio Disturbance Recordings (RDR) 82 occurring in the disturbed cell 76 of the telecommunications network 10 run in conjunction with each other. RDR is a feature designed to monitor radio disturbance events 78 that affect speech quality in a telecommunications network 10. The degree of radio channel interference in the network 10 is measured by the RDR 82. Network interference from both adjacent channel sites and external radio interference, which in most cases comes from sources outside the telecommunications network 10, can be measured. The data recorded will be useful to the network operator in locating and correcting the cause of the disturbance events 78.

While the RDR 82 measures the disturbance seen on a device 84, the CER 80 identifies the call start and stop times for possible offending cells 72. The time stamps of the call start attempts (voice channel seizure events) in CER 80 for possible adjacent channel (or adjacent channel) mobile stations 42. The recorded call events 80 are then correlated with the recorded disturbance events 82. A distribution of disturbed cell 76 and offending cells 72 within the telecommunications network 10 is then computed as a function of time to obtain a statistical correlation of call events 80 in offending cells 72 and subsequent disturbance events 78 resulting in the disturbed cell 76. This is done to identify the possible source of disturbance events 78 within the disturbed cell 76.

One of the most important data components to collect from the method in analyzing interference is the start time of sealing. Sealing of a device 84 occurs due to a adjacent channel mobile station 42 in an offending cell 72 which transmits to the BTS 44 in the disturbed cell 74. As such, the mobile station signal in the offending cell 72 interferes with the BTS 44 in the disturbed cell 74 because the offending signal can reach this particular disturbed cell 74, even though it is farther away. Therefore, when the offending signal is above a certain threshold, then any call which is placed on that channel, or that device, is not going to go through due to the presence of too much pre-existing signal.

That is, the interference created from the adjacent/co-channel interference signal reduces the Carrier-to-Interference (C/I), or coverage-to-interference, ratio to an unacceptable level. The C/I ratio, as a function of the telecommunications network equipment, goes below some predetermined acceptable level so that there is no reason for allowing a call to be made. As a result, it is a better solution to seal the device 84 rather than have an unacceptable call due to interference. This results in minimal use of network resources. The related application referenced herein provides a method and system for identifying sources of radio disturbances resulting from, for example, adjacent channel interference that permit the network operator to determine where the sources of such disturbances are located within the network coverage area.

Figure 4:
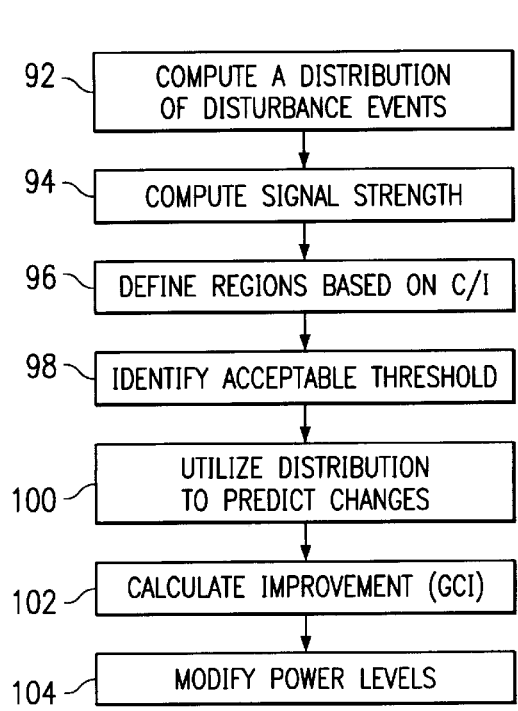
FIG. 4 is a flow diagram illustrating process steps for implementing the method and system of the present invention, in accordance with a preferred embodiment.

FIG. 4 is a flow diagram illustrating process steps for implementing the method and system of the present invention, in accordance with a preferred embodiment, and denoted generally as 90. It can be appreciated by those skilled in the art that FIG. 4, as illustrated and described herein, presents a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "designating," "delivering" or "conveying", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a mobile station, or cellular telephone subscriber unit, instructions implementing these method steps. Such instructions can be maintained within a computer memory location of a wireless telephone base station or at a central broadcasting center from which such base stations receive instructions. Implementation of the method described herein is left to the discretion of a particular wireless telephone system designer, whether cellular-based or otherwise.

It can be appreciated by those skilled in the art that the methods described herein can be implemented as a program product (e.g., a control program residing in a computer memory). The program product contains instructions that when executed on a CPU, carry out the operations depicted in the logic flow diagram of FIG. 4. While the present invention is described in the context of a fully functional telecommunications network 10, those skilled in the art will further appreciate that the present invention is capable of being distributed as a program product in a variety of forms. The present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Preferred implementations of the invention can include implementations to execute the method or methods described herein as a program product residing in a the memory of a microcomputer. Alternatively, a preferred embodiment of the present invention can include a program product residing in a microcomputer memory located at an MSC (e.g., MSC 27 of FIG. 1 herein). The MSC 27 controls system operations in cellular telephone networks, thereby managing calls, tracking billing information, and locating cellular subscribers. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a user's workstation by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Thus, as depicted at step 92 of FIG. 4, a distribution is computed of disturbance events in the disturbed cells as a function of disturbances created by the offending cells. Concurrently, as illustrated at step 94, signal strength is computed for calls in progress and calls not in progress (on an idle channel). The signal strength is then utilized in calculating C/I probabilities. Thereafter, as described at step 96, regions are defined based on the C/I ratio levels. As illustrated next at step 98, an acceptable threshold for the network is identified in order to assist in defining the regions at step 96.

Once the distribution of disturbance events is complete, then as depicted at step 100, such distribution is utilized in predicting changes in coverage as changes in the C/I ratio of the cells are made. Those skilled in the art will appreciate that disturbance events may not all be attributable to mobile stations associated with the offending cell. External sources can also be the cause of such disturbance events. In predicting changes, the improvement, or GCI, in the C/I ratio level in the disturbed cell and the effect in C/I ratio levels in the offending cells is calculated at step 102. This is accomplished by first increasing the signal strength in the offending cells while decreasing the coverage provided by the disturbed cell. The signal strength and interference is thus adjusted so as to avoid significant decrease in coverage in the offending cells. Step 102 may also be accomplished by decreasing the signal strength in the offending cells while increasing the coverage provided by the disturbed cell. Again, adjusting may be necessary to avoid sacrificing coverage in the offending cells.

Once the improvement, or GCI, has been calculated at step 102, a modification of the power levels is performed at step 104. This included first checking whether the improved carrier-to-interference ratio level (GCI) for a higher power setting (Power+Delta) is acceptable. If the GCI is positive and the higher power setting is acceptable, then the recommended mobile station power is set to (Power+Delta). Otherwise, it is then determined whether the power for a weaker setting is acceptable. The alternative is to retain the current setting if neither weaker nor higher power settings are acceptable.

FIG. 5 illustrates a probability (mass) distribution of coverage-to-interference in a cell denoted generally as 110, in accordance with a preferred embodiment of the present invention. In the initial operations associated with the flow diagram of FIG. 4, a distribution of disturbance events is computed based on the possible sources of disturbance identified in the related application. As such, the mass distribution is a probability matrix for different C/I ratio levels identified by computing the signal strength for a call in progress, as well as a call not in progress (on an idle channel). The signal strength (SS) thresholds can be varied in accordance with network requirements. For illustrative purposes, the threshold shown here is 17 dB, and FIG. 1 characterizes the carrier-to-interference of the cell 110 into four possible areas for C/I<17. That is, the C/I probabilities are: low C and low I, high C and low I, high C and high I, and low C and high I, all where C/I<17. Each combination of signal strength (C) and disturbance (I) yield a certain C/I value (C(dB)−I(dB)). Thus, its probability can be calculated according to Equation (1) as:

$$|P(C/I=z)\uparrow_{C=x, I=y} = P(C=x)P(I=y).$$  Eq. (1)

For reference purpose, the quantity "C" is also referred to as the signal strength (SS) and is characterized by a probability distribution P(C=x) or PDF(SS). Similarly, the quantity "I" is also referred to as disturbance and is characterized by P(I=y) or PDF($SS_{dist}$).

Another view of the mass distribution matrix is shown in FIG. 6 and denoted generally as 120. For those skilled in the art, the mass distribution table 120 may also be referred to as a C/I distribution matrix or Signal Strength (SS) Plan. Once the distribution of disturbance events in the disturbed cell as a function of disturbances created by the offending cells has been computed, the signal strength for calls in progress and calls not in progress (on an idle channel) are computed. Thus, the signal strength is utilized in calculating C/I probabilities, which in turn assist in defining the five regions shown in FIG. 6. That is, the five regions which make up the SS plan are based on carrier-to-interference ratio levels, and each, Mass(x,y), is summed inside the corresponding region in order to do cell assessment.

SS plan 120 shows the X-axis as signal strength and the Y-axis as disturbance. Therefore, Region I is defined as Low Disturbance Level and Low SS, where C/I<17 dB. Region II is defined as the area which defines High Disturbance Level and Low SS, where C/I<17 dB. Region III is defined as High Disturbance Level and High SS, where C/I<17 dB, while Region IV refers to the small area where Disturbance Level is Low and SS is High, with C/I<17 dB. Thus, Region V are all calls with C/I being above 17 dB.

The mass distribution matrix is a tool that can be utilized to calculate the C/I level distribution in the cell system, or network 10; to identify any weak C/I areas; and to identify the reason for the weak C/I areas. As such, the weak C/I areas correspond to the region below the line shown as C/I=17 dB. Therefore, the reasons of weak C/I, as illustrated in Table 1 below and with reference to FIG. 6 are:

TABLE 1

Reasons for weak C/I from the mass distribution matrix

| signal strength (C) | Disturbance (D) | Notation |
|---|---|---|
| Weak (C<−100 dBm) | Weak (I<−110 dBm) | (SDWW) |
| Weak (C<−100 dBm) | Strong (I>−110 dBm) | (SDWS) |
| Strong (C>−100 dBm) | Strong (I>−110 dBm) | (SDSS) |
| Strong (C>−100 dBm) | Weak (I<−110 dBm) | (SDSW) |

Table 1 illustrates the reasons for weak C/I from the mass distribution matrix. That is, these areas on the mass distribution matrix identify the causes of weak C/I in the cell. As such, this information enables us to predict changes in the C/I ratio level when an offender's uplink power is increased. The present invention allows us to identify and implement a tradeoff based on the predictions so as to accomplish acceptable coverage and interference thresholds for the network 10.

Figure 7:
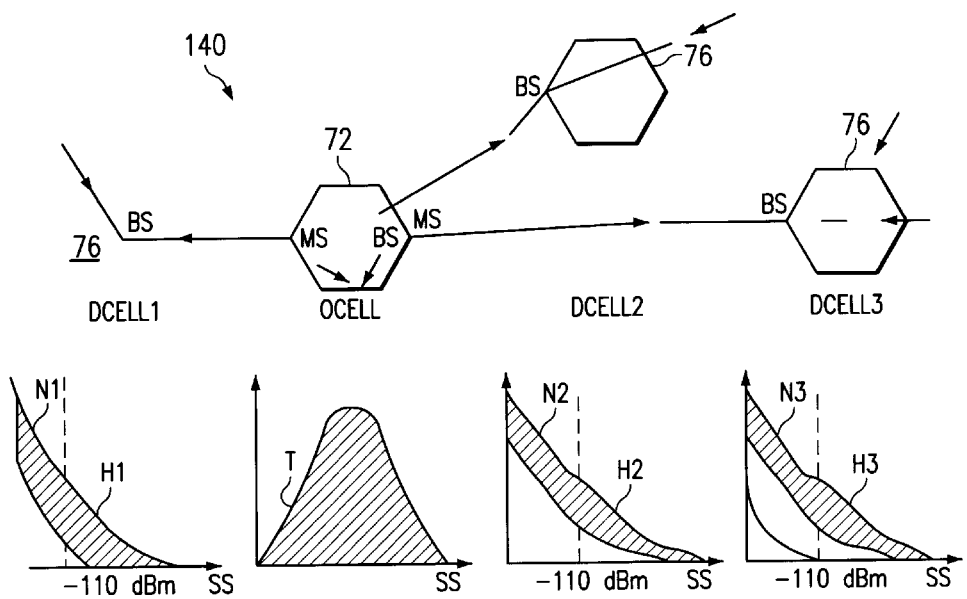
FIG. 7 illustrates the distribution of an offending cell and the disturbed cells, in accordance with the preferred embodiment of the present invention.

With reference to FIG. 7, the distribution of the offending cells and the disturbed cells is illustrated and denoted generally as 140, in accordance with the preferred embodiment of the present invention. The offending cell 72 is characterized as "OCELL", while the disturbed cells 76 are labeled as "DCELL1", "DCELL2" and "DCELL3", respectively. As discussed in the related application, mobile stations transmit high power in the OCELL 72 which results in the disturbance of the disturbed cells 76. The PDF below the OCELL 72 shows the received signal strength distribution on the uplink of this cell. The disturbance itself is divided into two pars based on signal strength (SS). The portion, N1, N2 and N3 are values of received signal strength that can be tolerated by the system and are not considered as strong disturbances. For illustrative purposes, the threshold here is −110 dBm. On the other hand, H1, H2 and H3 depict the distribution of signal strength that is greater than −110 dBm. Here, the distribution is presented in 4 dB intervals starting at zero ("0"=−118 dBm). In analyzing strong disturbances, usually only the cumulative distribution from −110 dBm onward is considered.

The mass distribution matrix and cell disturbance distribution are utilized for determining a tradeoff. The quantity is defined as GCI, or the improvement in C/I in the present cell (where PLVM is adjusted) and the price paid elsewhere for a degraded C/I. The degradation is calculated using the disturbance distribution. As such, the mass distribution matrix specifies the ratio of weak C/I affected by stronger disturbances. Furthermore, the offender's information explains the effect of increase in the mobile station power on other cells. The improvement, or GCI is calculated as follows:

$GCI_1$=decrease in weak C/I in the offending cell+increase in weak C/I in the disturbed cell;

or $GCI_2$=increase in weak C/I in the offending cell+decrease in weak C/I in the disturbed cell.

That is, two GCI values are calculated based on the predictions in order to determine the acceptable tradeoff, if any. $GCI_1$ takes into consideration increasing the power by, for example, 4 dB, while $GCI_2$ takes into consideration decreasing the power by, for example, 4 dB. For illustrative purposes, the following calculation is described with reference to $GCI_1$. The formula for $GCI_1$ can be described as having two terms: $T_1$="decrease in weak C/I in the offending cell" and $T_2$="increase in weak C/I in the disturbed cells."

The formula for $T_1$ is: $T_1$=(SDWW+SDWS) * (1-predicted ratio of weak SS/current ratio of weak SS) * cell contribution to the overall digital traffic (disturbed cell). The term "SDWW+SDWS" is defined as the portion of weak C/I in the cell that is caused by weak SS. These terms can be found in the C/I mass distribution matrix, as well as Table 1 described herein. Furthermore, the "predicted ratio of weak SS" is calculated from SS CDF assuming that weak SS is below the desired threshold (e.g., −100 dBm) and power is increased by 4 dB, taking into consideration the mobile station type distribution on its capabilities to change the power. Similarly, the "current ratio of weak SS" is calculated from SS CDF assuming that weak SS is below −100 dBm. Finally, the "cell contribution to the overall digital traffic" is the percentage of digital versus analog traffic.

The second term, or $T_2$ is calculated by summing all co-channel cells. More specifically, $T_2$=(SDSW+SDWS+SDSS) * (1-(predicted disturbance distribution for dist. level>−110 dBm)/(current disturb. facet for dist. level>−110 dBm) * percentage of disturbances stronger than −110 dBm coming from the considered offender * cell contribution to the overall digital traffic. The term "SDWW+SDWS+SDSS" is defined as the portion of weak C/I in disturbance. These terms may be found in the C/I mass distribution matrix, as well as Table 1 described herein. Furthermore, "predicted (for the offender) disturbance facet for dist. level>−110 dBm" is calculated from the "current disturb. facet for dist. level>−110 dBm" assuming that the power is increased by 4 dB, and taking into consideration the mobile station type distribution on its capabilities to change the power. The value associated with the "percentage of disturbances stronger than −110 dBm coming from the considered offender" comes from the distribution matrix, which shows the offenders' contribution per cell level. Finally, "cell contribution to the overall digital traffic" is the ratio of digital versus analog traffic.

Figure 8:
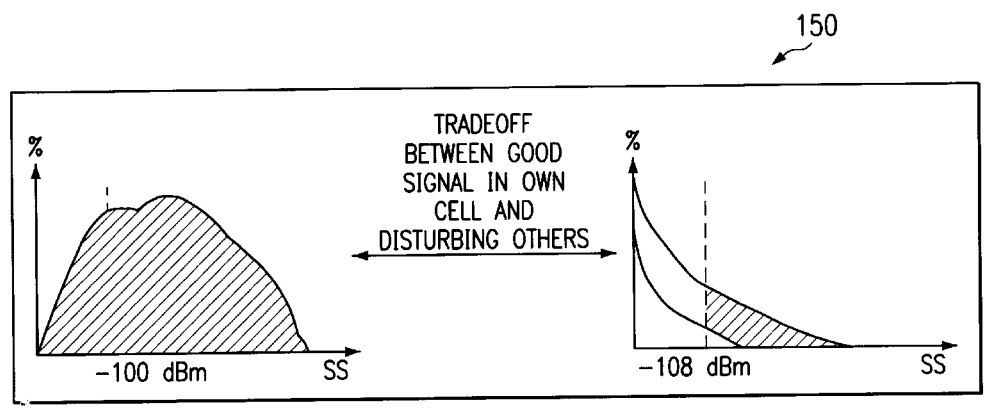
FIG. 8 illustrates tradeoff between coverage in the offending cell and disturbance in the disturbed cells as is applied to the present invention.

Once the GCI values have been calculated utilizing the predictions based on the disturbance distribution matrix, a tradeoff may be implemented in order to optimize the network 10, while minimizing interference and retaining adequate coverage. FIG. 8 illustrates the tradeoff between coverage in the offending cell and disturbance in the disturbed cells as is applied to the present invention, and is denoted generally as 150. The disturbance distribution for each offending cell allows us to predict the impact on the disturbance level if the output power is increased or decreased. The tradeoff 150 between coverage and interference generates this recommendation. The tradeoff is between improving or degrading coverage in the offending cell with a corresponding decrease or increase of disturbance in the disturbed cells.

After calculating the GCI values and implementing a tradeoff, an adjustment must be made in order to accomplish the maximum output power. The algorithm, shown below, is for setting the power, yet avoiding a significant decrease in coverage in the offending cell.

The algorithm is defined as:
IF
   GCI (Power+Delta)>0
THEN
   R_Power=Power+Delta
ELSE IF
   GCI (Power−Delta)>0
THEN
   R_PLVM=Power−Delta
ELSE
   THEN RETAIN CURRENT POWER
END Where R_PLVM is the recommended power level of a mobile. The algorithm checks whether the GCI for a higher power setting (Power+Delta) is acceptable. If that is the case, i.e., the GCI is positive, then the recommended mobile station power is set to Power+Delta. If that is not the case, then the algorithm checks whether the power for a weaker setting is acceptable. It that is also not acceptable, then the current setting is retained.

Those skilled in the art can thus appreciate that the invention described herein discloses a method and system, which may take the form of a program product, for optimizing signal strength and interference characteristics in a wireless telecommunications network. By either reducing the offending radio base station output power or altering the frequency plan, interference can be mitigated. The method and system described herein are based on measurements, which provide an advantage over prediction tools. In addition, the method and system presented herein utilizes "switch statistics" and therefore, does not involve costly procedures. In short, utilizing the method and system described herein results in improvements in the performance of a wireless telecommunications network.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. In a wireless telecommunications network including a plurality of cells with at least one of said cells being disturbed (the "disturbed cell") by events occurring in one or more offending cells, a method of optimizing the signal strength and interference characteristics of the network comprising the steps of:
   computing a distribution of disturbance events in the disturbed cell as a function of disturbances created by the offending cells;
   utilizing the distribution of disturbance events to predict changes in coverage of the offending cells as changes in the carrier-to-interference (C/I) ratio of the disturbed call are made; and
   modifying the power levels of wireless components in the network to reach acceptable tradeoffs between interference and coverage, said tradeoff being a function of the predicted changes in C/I and accept able coverage and interference thresholds for the network.

2. The method according to claim 1 wherein said step of computing a distribution of disturbance events in the disturbed cell as a function of disturbances created by the offending cells further comprises the step of computing the signal strength for calls in progress and calls not in progress (on an idle channel), wherein said signal strength is utilized in calculating carrier-to-interference (C/I) probabilities.

3. The method according to claim 1 wherein said step of computing a distribution of disturbance events in the disturbed cell as a function of disturbances created by the offending cells further comprises the step of defining regions based on carrier-to-interference (C/I) ratio levels.

4. The method according to claim 3 wherein said defining step further comprises the step of identifying an acceptable threshold for said network for defining said regions.

5. The method according to claim 1 wherein said utilizing step further comprises the step of calculating the improvement in carrier-to-interference (C/I) ratio level in said disturbed cell and the effect in C/I ratio level in said offending cells.

6. The method according to claim 5 wherein said calculating step further comprises the step of increasing the signal strength in said offending cells while decreasing the coverage provided by said disturbed cell.

7. The method according to claim 6 wherein said steps of increasing and decreasing, respectively, further comprise the step of adjusting said signal strength and interference so as to avoid a significant decrease in coverage in said offending cells.

8. The method according to claim 5 wherein said calculating step further comprises the step of decreasing the signal strength in said offending cells while increasing the coverage provided by said disturbed cell.

9. The method according to claim 1 wherein said step of modifying the power levels further comprises the steps of:
   checking whether the improved carrier-to-interference ratio level (GCI) for a higher power setting (Power+Delta) is acceptable;
   setting the recommended mobile station power to Power+Delta if said GCI is positive and the higher power setting is acceptable;
   determining if the power for a weaker setting is acceptable if said GCI for Power+Delta is not acceptable; and
   retaining the current setting if neither weaker nor higher power settings are acceptable.

10. In a wireless telecommunications network including a plurality of cells with at least one of said cells being disturbed (the "disturbed cell") by events occurring in one or more offending cells, a system of optimizing the signal strength and interference characteristics of the network comprising:
    means for computing a distribution of disturbance events in the disturbed cell as a function of disturbances created by the offending cells;
    means for utilizing the distribution of disturbance events to predict changes in coverage of the offending cells as changes in the carrier-to-interference (C/I) ratio of the disturbed cell are made; and
    means for modifying the power levels of wireless components in the network to reach acceptable tradeoffs between interference and coverage, said tradeoff being a function of the predicted changes in C/I and acceptable coverage and interference thresholds for the network.

11. The system according to claim 10 wherein said means for computing a distribution of disturbance events in the disturbed call as a function of disturbances created by the offending cells further comprises means for computing the signal strength for calls in progress and call not in progress (on an idle channel), wherein said signal strength is utilized in calculating carrier-to-interference (C/I) probabilities.

12. The system according to claim 10 wherein said means for computing a distribution of disturbance events in the disturbed cell as a function of disturbances created by the offending cells further comprises means for defining regions based on carrier-to-interference (C/I) ratio levels.

13. The system according to claim 12 wherein said means for defining further comprises means for identifying an acceptable threshold for said network for defining said regions.

14. The system according to claim 10 wherein said means for utilizing further comprises means for calculating the improvement in carrier-to-interference (C/I) ratio level in said disturbed cell and the effect in C/I ratio level in said offending cells.

15. The system according to claim 14 wherein said means for calculating further comprises means for increasing the signal strength in said offending cells while decreasing the coverage provided by said disturbed cell.

16. The system according to claim 15 wherein said means for increasing and decreasing, respectively, further comprises means for adjusting said signal strength and interference so as to avoid a significant decrease in coverage in said offending cells.

17. The system according to claim 14 wherein said means for calculating further comprises means for decreasing the signal strength in said offending cells while increasing the coverage provided by said disturbed cell.

18. The system according to claim 10 wherein said means for modifying the power levels further comprises:
    means for checking whether said improvement in carrier-to-interference ratio level (GCI) for a higher power setting (Power+Delta) is acceptable;
    means for setting the recommended mobile station power to Power+Delta if said GCI is positive and the higher power setting is acceptable;
    means for determining if the power for a weaker setting is acceptable said GCI for Power+Delta is not acceptable; and
    means for retaining the current setting if neither weaker nor higher power settings are acceptable.

19. In a wireless telecommunications network including a plurality of cells with at least one of said cells being disturbed (the "disturbed cell") by events occurring in one or more offending cells, a program product for optimizing the signal strength and interference characteristics of the network comprising:
    instruction means for computing a distribution of disturbance events in the disturbed cell as a function of disturbances created by the offending cells;
    instruction means for utilizing the distribution of disturbance events to predict changes in coverage of the offending cells as changes in the carrier-to-interference (C/I) ratio of the disturbed cell are made; and
    instruction means for modifying the power levels of wireless components in the network to reach acceptable tradeoffs between interference and coverage, said tradeoff being a function of the predicted changes in C/I and acceptable coverage and interference thresholds for the network.

20. The program product according to claim 19 wherein said instruction means for computing a distribution of disturbance events in the disturbed cell as a function of disturbances created by the offending cells further comprises instruction means for computing the signal strength for calls in progress and calls not in progress (on an idle channel), said signal strength for utilizing in calculating carrier-to-interference (C/I) probabilities.

21. The program product according to claim 19 wherein said instruction means for computing a distribution of disturbance events in the disturbed cell as a function of disturbances created by the offending cells further comprises instruction means for defining regions based on carrier-to-interference (C/I) ratio levels.

22. The program product according to claim 21 wherein said instruction means for defining further comprises instruction means for identifying an acceptable threshold for said network for defining said regions.

23. The program product according to claim 19 wherein said instruction means for utilizing further comprises instruction means for calculating the improvement in carrier-to-interference (C/I) ratio level in said disturbed cell and the effect in C/I ratio level in said offending cells.

24. The program product according to claim 23 wherein said instruction means for calculating further comprises instruction means for increasing the signal strength in said offending cells while decreasing the coverage provided by said disturbed cell.

25. The program product according to claim 24 wherein said instruction means for increasing and decreasing, respectively, further comprises instruction means for adjusting said signal strength and interference so as to avoid a significant decrease in coverage in said offending cells.

26. The program product according to claim 23 wherein said instruction means for calculating further comprises instruction means for decreasing the signal strength in said offending cells while increasing the coverage provided by said disturbed cell.

27. The program product according to claim 19 wherein said instruction means for modifying the power levels further comprises:

instruction means for checking whether the improved carrier-to-interference ratio level (GCI) for a higher power setting (Power+Delta) is acceptable;

instruction means for setting the recommended mobile station power to Power+Delta if said GCI is positive and the higher power setting is acceptable;

instruction means for determining if the power for a weaker setting is acceptable if said GCI for Power+Delta is not acceptable; and instruction means for retaining the current setting if neither weaker nor higher power settings are acceptable.

* * * * *